(12) United States Patent
Chang

(10) Patent No.: US 12,465,262 B2
(45) Date of Patent: Nov. 11, 2025

(54) ELECTRONIC DEVICE FOR MEASURING ELECTROCARDIOGRAM AND OPERATION METHOD IN ELECTRONIC DEVICE

(71) Applicant: Samsung Electronics Co., Ltd., Gyeonggi-do (KR)

(72) Inventor: Namseok Chang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 18/084,015

(22) Filed: Dec. 19, 2022

(65) Prior Publication Data

US 2023/0122036 A1    Apr. 20, 2023

Related U.S. Application Data

(63) Continuation of application No. PCT/KR2021/007892, filed on Jun. 23, 2021.

(30) Foreign Application Priority Data

Jun. 25, 2020   (KR) .................. 10-2020-0077591

(51) Int. Cl.
  *A61B 5/308*    (2021.01)
  *A61B 5/271*    (2021.01)
  (Continued)

(52) U.S. Cl.
  CPC .............. *A61B 5/308* (2021.01); *A61B 5/271* (2021.01); *A61B 5/28* (2021.01); *A61B 5/333* (2021.01); *A61B 5/339* (2021.01)

(58) Field of Classification Search
  CPC .................................................. A61B 5/332
  See application file for complete search history.

(56) References Cited

U.S. PATENT DOCUMENTS

| 3,991,747 A | 11/1976 | Stanly et al. |
| 2016/0228064 A1 | 8/2016 | Jung et al. |

(Continued)

FOREIGN PATENT DOCUMENTS

| CN | 102655806 A | 9/2012 |
| CN | 107865653 A | 4/2018 |

(Continued)

OTHER PUBLICATIONS

Korean Office Action dated Feb. 3, 2025.
European Search Report dated Oct. 6, 2023.
European Examination Report dated Jun. 6, 2025.

*Primary Examiner* — George R Evanisko
(74) *Attorney, Agent, or Firm* — Cha & Reiter, LLC.

(57) ABSTRACT

An electronic device and method are disclosed herein. The electronic device includes a memory, an electrode module including at least four electrodes respectively connectable to a human body, and at least one processor. The processor implements the method, including: when the at least four electrodes are connected to designated connection points on the human body, obtain contact impedance values from the at least four electrodes, set electrode combination information for respectively connecting the at least four electrodes with the designated connection points, based on the obtained contact impedance values, and store the set electrode combination information in the memory, and measure an electrocardiogram (ECG) based on signals received from the electrode module while the at least four electrodes are respectively reconnected to the designated connection points, based on the stored electrode combination information.

12 Claims, 7 Drawing Sheets

(51) Int. Cl.
*A61B 5/28* (2021.01)
*A61B 5/333* (2021.01)
*A61B 5/339* (2021.01)

(56) References Cited

U.S. PATENT DOCUMENTS

| | | |
|---|---|---|
| 2016/0310071 A1 | 10/2016 | Kim |
| 2017/0172448 A1 | 6/2017 | Shin et al. |
| 2018/0014742 A1* | 1/2018 | Iwawaki .............. A61B 5/02 |
| 2018/0220972 A1 | 8/2018 | Jeong et al. |
| 2018/0235508 A1 | 8/2018 | Cosentino et al. |
| 2018/0235542 A1 | 8/2018 | Yun et al. |
| 2019/0074729 A1 | 3/2019 | Wittenberg et al. |
| 2019/0167144 A1 | 6/2019 | Jung et al. |
| 2020/0064906 A1 | 2/2020 | Cha |
| 2020/0077954 A1 | 3/2020 | Bossetti et al. |
| 2020/0096463 A1 | 3/2020 | Ano et al. |
| 2020/0261000 A1 | 8/2020 | Kim et al. |
| 2021/0000376 A1 | 1/2021 | Lee et al. |

FOREIGN PATENT DOCUMENTS

| | | |
|---|---|---|
| EP | 1690565 A2 | 8/2006 |
| JP | 2016-154754 A | 9/2016 |
| JP | 2018-538114 A | 12/2018 |
| JP | 2019-126255 A | 7/2019 |
| KR | 10-2008-0088727 A | 10/2008 |
| KR | 10-2009-0124140 A | 12/2009 |
| KR | 10-2013-0107066 A | 10/2013 |
| KR | 10-2015-0068333 A | 6/2015 |
| KR | 10-2016-0096475 A | 8/2016 |
| KR | 10-2016-0126802 A | 11/2016 |
| KR | 10-1828068 B1 | 2/2018 |
| KR | 10-2019-0074865 A | 6/2019 |
| KR | 10-2019-0097474 A | 8/2019 |
| KR | 10-2019-0136950 A | 12/2019 |

* cited by examiner

ELECTRONIC DEVICE FOR MEASURING ELECTROCARDIOGRAM AND OPERATION METHOD IN ELECTRONIC DEVICE

CROSS-REFERENCE TO RELATED APPLICATION(S)

This application is a continuation of International Application No. PCT/KR2021/007892 filed on Jun. 23, 2021, designating the United States, in the Korean Intellectual Property Receiving Office, and claiming priority to Korean Patent Application KR 10-2020-0077591 filed on Jun. 25, 2020 in the Korean Intellectual Property Office, the disclosures of which are all incorporated by reference herein in their entireties.

BACKGROUND

Technical Field

Certain embodiments of the disclosure relate to electronic devices with biometric detection, and, more particularly, to an electronic device with a configurable electrocardiogram detection function.

Description of Related Art

Recently, electronic devices have incorporated a greater variety of form factors, which may increase user convenience purposes and portability.

There have also been increases in societal and consumer interest in healthy living and exercise. Accordingly, many consumer-grade electronic devices with variation and configurable form factors have been equipped with sensors capable of measuring user biometrics, providing various health-related functions, and tracking a user's physical condition. Accordingly, it may include functions such as heart rate monitoring, body composition analysis, and/or electrocardiogram (ECG) measurement.

SUMMARY

ECG measurements and the bio-electrical impedance analysis (BIA) function are usually performed separately, the electrocardiogram is typically measured via a separate device that is dedicated to ECG measurements.

It is often difficult to accurately measure the ECG waveform when the skin in contact with the ECG measurement electrode leads is excessively dry.

Further, when the user's skin is dry, the contact impedance by the BIA function increases, such that the size of the measured ECG waveform is reduced. Alternatively, saturation may occur, in which the values near the maximum and minimum of the measurement range will be fixed to constant values. In some cases, the ECG electrode lead positions are fixed (e.g., as in a smart wearable device providing ECG measurement functionality), so it may be inconvenient to moisturize the skin to reperform the ECG measurement.

According to embodiments of the disclosure, an electronic device is provided for measuring ECG waveform based on contact impedance, so as to enhance ECG measurement performance.

According to an embodiment of the disclosure, an electronic device may comprise a memory, an electrode module including at least four electrodes, and at least one processor electrically connected with the electrode module and the memory. The at least one processor may be configured to obtain contact impedance values from the at least four electrodes respectively connected to designated connection points of a human body, set electrode combination information for respectively connecting the at least four electrodes with the designated connection points, based on the obtained contact impedance values, and store the set electrode combination information in the memory and measure an electrocardiogram (ECG) of the human body based on signals received from the electrode module while the at least four electrodes are respectively connected to the designated connection points, based on the stored electrode combination information.

Further, according to an embodiment, a method for operation in an electronic device may comprise obtaining contact impedance values from at least four electrodes included in an electrode module of the electronic device, setting and storing electrode combination information for respectively connecting the at least four electrodes with designated connection points based on the obtained contact impedance values, and measuring an ECG of a human body based on signals received from the electrode module while the at least four electrodes are respectively connected to the designated connection points based on the electrode combination information.

Further, according to an embodiment, there may be provided a non-transitory storing medium storing a program including executable instructions that, when executed by a processor of an electronic device, cause the an electronic device to obtain contact impedance values from at least four electrodes included in an electrode module of the electronic device, set and store electrode combination information for respectively connecting the at least four electrodes with designated connection points based on the obtained contact impedance values, and measure an ECG of a human body based on signals received from the electrode module while the at least four electrodes are respectively connected to the designated connection points based on the electrode combination information.

According to an embodiment of the disclosure, the electronic device is a device capable of measuring both contact impedance and ECG. By connecting at least four electrodes to designated connection points, respectively, of the human body, it is possible to reduce the contact impedance between the positive pole and negative pole of the connection points of the human body, thereby enhancing the quality of ECG measurement. Further, even when the ECG is not properly measured (e.g., in situations where the user's skin is excessively dry), it is possible to configure the ECG measurements by configuring appropriate electrode connections roles, according to detected contact impedance. This may improve the accuracy of ECG measurement even when conditions are not optimal (e.g., the user's skin is dry).

Further, according to an embodiment, the electronic device may allow simultaneous connection of two positive electrodes or negative electrodes to designated connection points, making ECG measurement more time efficient.

Further, according to an embodiment, the electronic device may allow simultaneous connection of two positive electrodes or negative electrodes to one of a number of designated connection points, so that one electrode may be configured in accordance with its higher contact impedance. Thus, two contact impedances are equivalently connected in parallel, reducing contact impedance. The contact impedance reduces over time. Simultaneous connection of two electrodes increases the contact area, accelerating the reduction in contact impedance.

BRIEF DESCRIPTION OF THE DRAWINGS

The same or similar reference denotations may be used to refer to the same or similar elements throughout the specification and the drawings.

DETAILED DESCRIPTION

Certain embodiments of the present disclosure are now described with reference to the accompanying drawings. As used herein, the term "user" may denote a human or another device using the electronic device.

Figure 1:
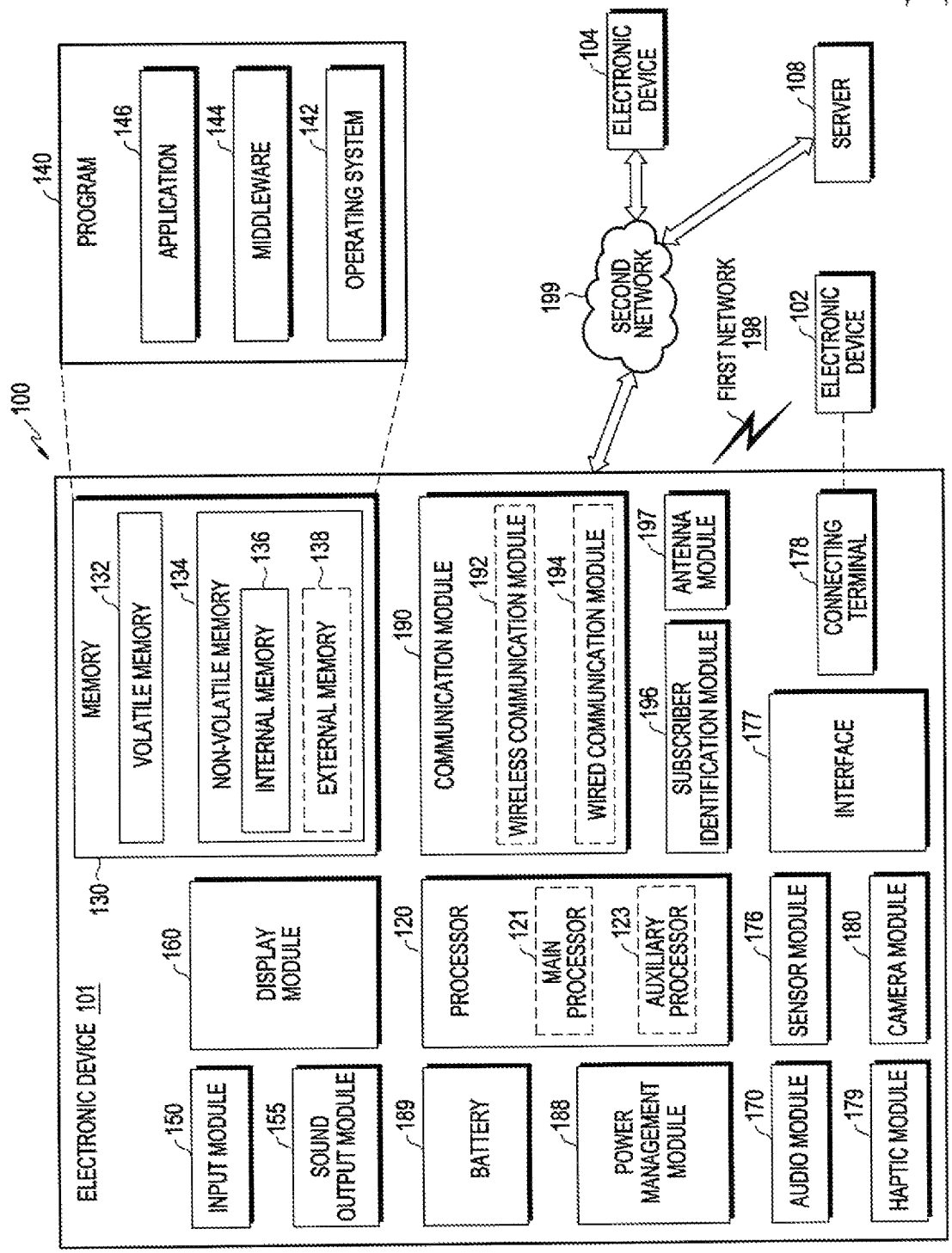
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
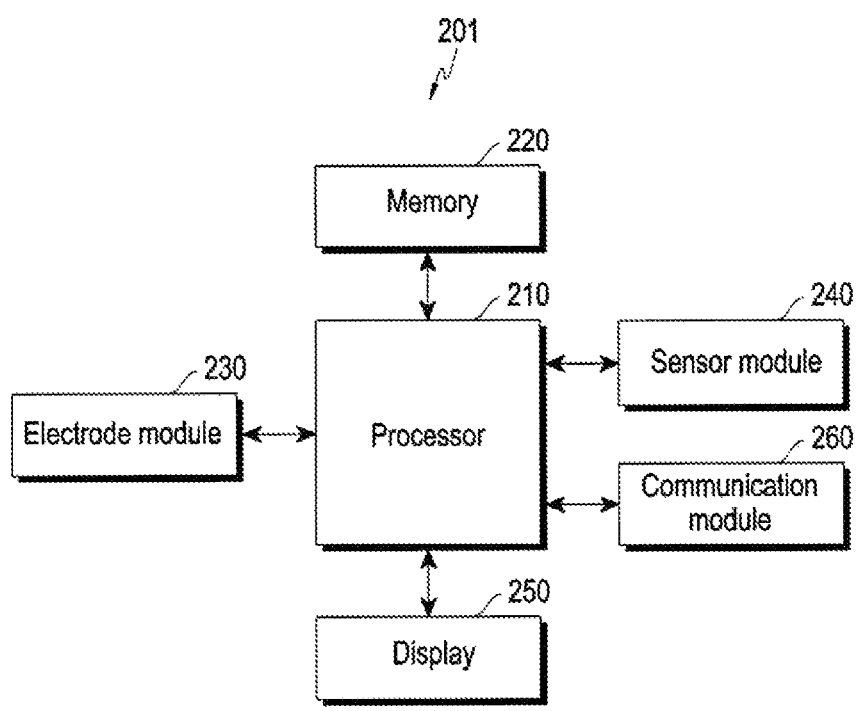
FIG. 2 is a view illustrating an example configuration of an electronic device according to an embodiment.
Figures 3A, 3B:
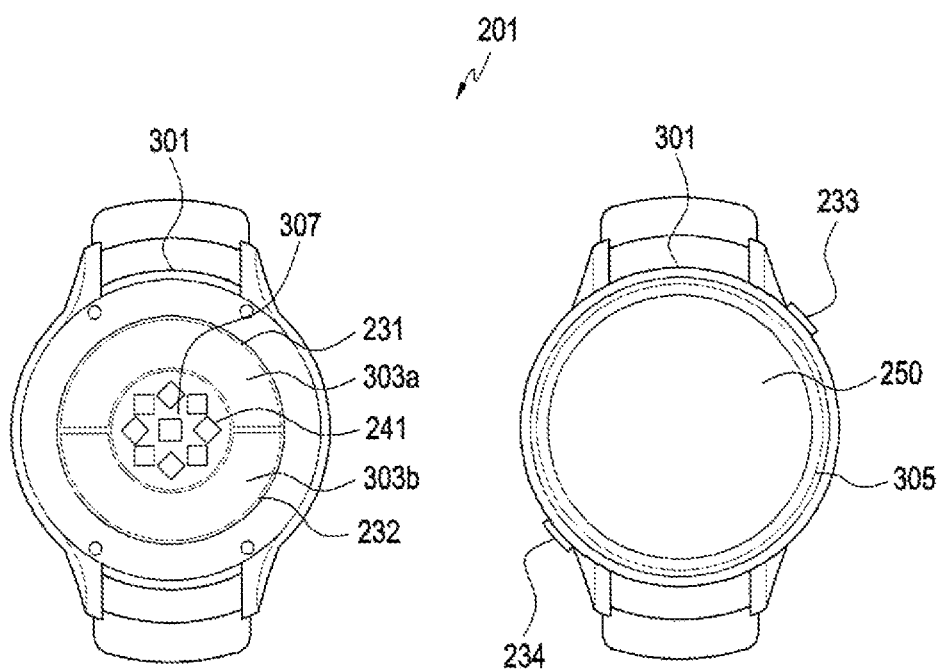
FIGS. 3A and 3B are views illustrating a configuration of an electronic device according to an embodiment.
Figure 4:
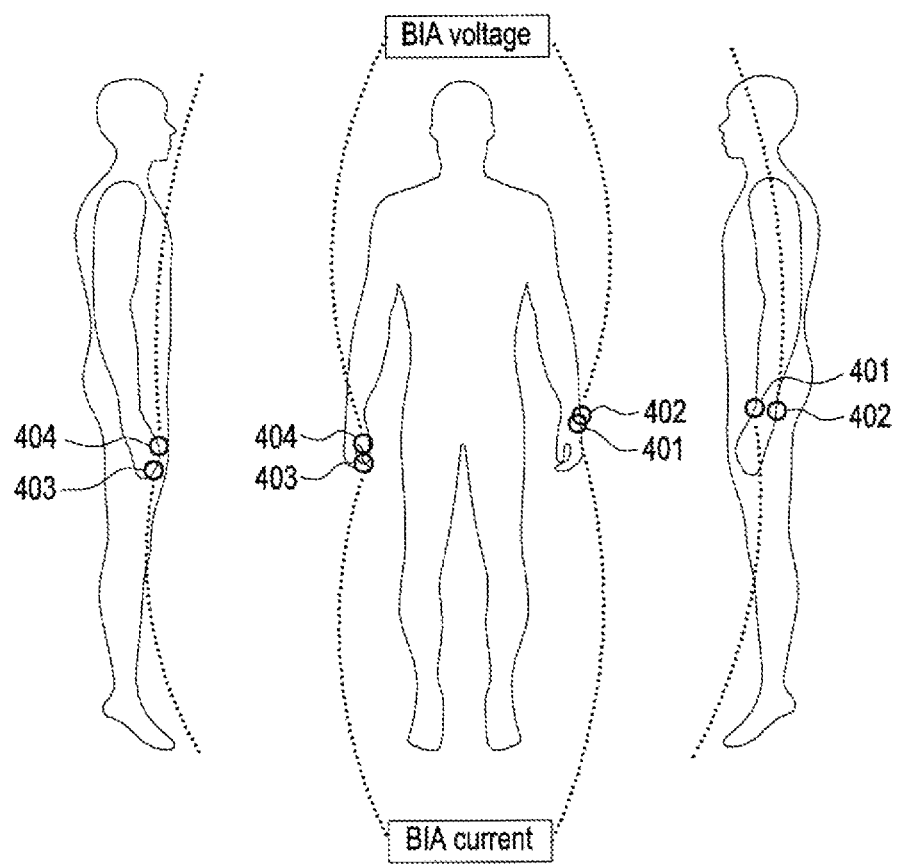
FIG. 4 is a view illustrating an example of connection points of a human body to which electrodes of an electronic device are connected according to an embodiment.

FIG. 2 is a view illustrating an example configuration of an electronic device 201 according to an embodiment. FIGS. 3A and 3B are views illustrating a configuration of an electronic device 201 according to an embodiment. FIG. 4 is a view illustrating an example of connection points of a human body to which electrodes of an electronic device 201 are connected according to an embodiment.

Referring to FIG. 2, according to an embodiment, an electronic device 201 (e.g., the electronic device 102 or 104 of FIG. 1) may include at least one processor 210, a memory 220, an electrode module 230, a sensor module 240, a display 250, and a communication module 260. The electronic device 201 is not limited thereto and may add other various components.

According to an embodiment, the electronic device 201 may be, e.g., a wearable device in the form of a wrist watch, which may be worn on the user's wrist or a wearable device that may be worn on another portion of the body (e.g., forearm, thigh, or another body portion where ECG may be measured). The electronic device 201 may be a small device in the form to be manipulated with the user's hand while being placed on the other hand.

Referring to FIGS. 3A and 3B, according to an embodiment, as shown in FIG. 3A, the electronic device 201 may have a first electrode 231 and a second electrode 232 disposed on at least two portions of a first member 303a and 303b disposed on a first surface (e.g., rear surface) of a housing 301. As shown in FIG. 3B, the electronic device 201 may have a third electrode 233 and a fourth electrode 234 disposed on at least two portions of a second member 305 formed to surround the display 250 disposed on a second surface (e.g., front surface) of the housing 301. The electronic device 201 may include at least one sensor 241 disposed on a third member 307, which is surrounded by the first member 303a and 303b disposed on the first surface, to be positioned in contact or proximity to the body skin. The at least one sensor 241 may be included in the sensor module 240. For example, the at least one sensor 241 may be capable of measuring biometric signals. For example, the third electrode 233 and the fourth electrode 234 may be disposed on a third surface (e.g., side surface). In the description of certain embodiments, that the third electrode 233 and the fourth electrode 234 are disposed on at least two portions of the second member 305 formed to surround the display 250 disposed on the second surface (e.g., front surface) of the housing 301 may indicate that the third electrode 233 and the fourth electrode 234 may be disposed on the side surface of the housing 301.

Referring to FIGS. 2, 3A, and 3B, according to an embodiment, the processor 210 may be electrically connected with the memory 220, the electrode module 230, the sensor module 240, the display 250, and/or the communication module 260. The processor 210 may obtain contact impedance values from at least four electrodes (e.g., a first electrode 231, a second electrode 232, a third electrode 233, and a fourth electrode 234) and set electrode combination information for respectively connecting the at least four electrodes included in the electrode module 230 to the designated connection points (which may also be referred to hereinafter as "points") based on the obtained contact impedance values. Hereinafter, connection between the electrode and the connection point according to the electrode combination information may mean electrical connection between the connection point and the electrode whose function/type (i.e., positive pole, negative pole, and reference pole) has been set/changed according to the electrode combination information. The processor 210 may be configured to measure the ECG (e.g., a ECG waveform) of the human body based on the signals received from the electrode module 230 while at least four electrodes are respectively connected to the designated connection points based on the electrode combination information. The processor 210 may control the display 250 to display an object or image to indicate that at least four electrodes are respectively connected to the designated connection points based on the electrode combination information. As another example, the processor 210 may output audio information to indicate that at least four electrodes are respectively connected to the designated connection points through an audio module (e.g., the audio module 170 of FIG. 1) or sound output module (e.g., the sound output module 155 of FIG. 1). The electrode combination information may include identification information about one electrode among the at least four electrodes configured to assign to a connection point of a reference pole (or referred to as a connection point connected with the reference pole or an electrode functioning as the reference pole (or reference pole electrode)) among the designated connection points and identification information about the remaining electrodes among the at least four electrodes respectively configured to assign to positive connection points (or referred to as connection points connected with the positive pole or electrode functioning as the positive pole (or positive pole electrode)) and negative connection points (or referred to as connection points connected with the negative pole or electrode functioning as the negative pole (or negative pole electrode)) among the designated connection points.

According to an embodiment, the processor 210 may set one electrode among the at least four electrodes to assign to the connection point designated as the reference pole based on the obtained contact impedance values (or referred to as setting the one electrode as the reference pole electrode). The processor 210 may set the remaining electrodes among the at least four electrodes to respectively assign to the connection points designated as the positive pole and the negative pole, based on the obtained contact impedance values (or referred to as setting the remaining electrodes as the electrodes of the positive pole and negative pole). The processor 210 may measure the ECG of the human body based on the signals received from the remaining electrodes (or the remaining positive and negative electrodes except for the reference pole electrode), from among the at least four electrodes respectively set to assign to the connection points of the positive pole and negative pole. The processor 210 may control the display 250 to display the resultant measurements of the ECG of the human body.

According to an embodiment, the sensor module 240 may include the electrode module 230. For example, the processor 210 may obtain the contact impedance values from the sensor module 240 based on the signals received from the at least four electrodes included in the electrode module 230. The processor 210 may set the sensor module 240 to assign one of the at least four electrodes to the connection point of the reference pole based on the obtained contact impedance values. Referring to FIGS. 2, 3A, 3B, and 4, according to an embodiment, the processor 210 may store the set electrode combination information in the memory 220. For example, the processor 210 may store the set electrode combination information in the form of, e.g., Table 1 below. In Table 1 below, the conditions (e.g., the first condition, the second condition, the third condition, and the fourth condition) may be set based on the contact impedance values obtained as the at least four electrodes (e.g., the first electrode 231, the second electrode 232, the third electrode 233, and the fourth electrode 234) included in the electrode module 230 are measured at the designated connection points (e.g., reference pole, positive pole, and negative pole) 401, 402, 403, and 404 of the human body as shown in FIG. 4. For example, when the electronic device 201 is a wrist watch-type wearable device which is wearable on the user's wrist, the positive connection points 401 and 402 among the designated connection points 401, 402, 403, and 404 of the human body may be set (or denoted) as two points on the left wrist contacted by the first electrode and the second electrode where the electronic device 201 is worn. For example, the negative connection points 403 and 404 among the designated connection points 401, 402, 403, and 404 of the human body may be set (or denoted) as points of the fingers contacting the third electrode 233 and the fourth electrode 234 on a right hand, which is capable of manipulating the electronic device 201 worn on the left wrist. For example, the connection point of the reference pole among the designated connection points 401, 402, 403, and 404 of the human body may be set as any one 401, 402, 403, or 404 among the positive or negative connection points according to a condition.

According to an embodiment, the reference pole (e.g., right leg driver circuitry (RLD)) electrode/connection point may be an electrode/connection point used to increase ECG measurement performance by reducing the signals which have the same phase of two contact electrodes (or positive and negative electrodes).

TABLE 1

| | first electrode | second electrode | third electrode | fourth electrode |
|---|---|---|---|---|
| first condition | positive pole | positive pole | reference pole | negative pole |
| second condition | positive pole | positive pole | negative pole | reference pole |
| third condition | reference pole | positive pole | negative pole | negative pole |
| fourth condition | positive pole | reference pole | negative pole | negative pole |

According to an embodiment, under the first condition of Table 1, the processor 210 may assign the first electrode 231 and the second electrode 232 to the connection points 401 and 402 of the positive pole of the human body, connect the third electrode 233 to the connection point 403 set as the reference pole of the connection points 403 and 404 of the negative pole, and assign the fourth electrode 234 to the connection point 404 as the remaining negative pole. In other words, under the first condition of Table 1, the processor 210 may assign the first electrode 231 and second electrode 232 of the positive pole to the first connection point 401 and second connection point 402 of the human body, assign the third electrode 233 of the reference pole to the third connection point 403 of the third connection point 403 and the fourth connection point 404, and assign the fourth electrode 234 of the negative pole to the fourth connection point 404. For example, the processor 210 may display, on the display 250, or transmit, to an external electronic device (e.g., the electronic device 101 or server 108 of FIG. 1) the electrode combination information according to the first condition of Table 1 to be identified by the user. As another example, the processor 210 may control the display 250 to display an image (or object) related to the human body reflecting the electrode combination information according to the first condition.

According to an embodiment, under the second condition of Table 1, the processor 210 may assign the first electrode 231 and the second electrode 232 to the connection points 401 and 402 of the positive pole of the human body, assign the fourth electrode 234 to the connection point 403 set as the reference pole of the connection points 404 and 404 of the negative pole, and assign the third electrode 233 to the connection point 403 of the remaining negative pole. In other words, under the second condition of Table 1, the processor 210 may assign the first electrode 231 and second electrode 232 of the positive pole to the first connection point 401 and second connection point 402 of the human body, assign the fourth electrode 234 of the reference pole to the fourth connection point 404 of the third connection point 403 and the fourth connection point 404, and assign the third electrode 233 of the negative pole to the third connection point 403. For example, the processor 210 may display, on the display 250, or transmit, to an external electronic device (e.g., the electronic device 101 or server 108 of FIG. 1) the electrode combination information according to the second condition of Table 1 to be identified by the user. As another example, the processor 210 may control the display 250 to display an image (or object) related to the human body reflecting the electrode combination information according to the second condition.

According to an embodiment, under the third condition of Table 1, the processor 210 may assign the third electrode 233 and the fourth electrode 234 to the connection points 403 and 404 of the negative pole of the human body, assign the first electrode 231 to the connection point 401 set as the reference pole of the connection points 401 and 402 of the positive pole, and assign the second electrode 232 to the connection point 402 of the remaining positive pole. In other words, under the third condition of Table 1, the processor 210 may assign the third electrode 233 and fourth electrode 234 of the negative pole to the third connection point 403 and fourth connection point 404 of the human body, assign the first electrode 231 of the reference pole to the first connection point 401 of the first connection point 401 and the second connection point 402, and assign the second electrode 232 of the positive pole to the second connection point 402. For example, the processor 210 may display, on the display 250, or transmit, to an external electronic device (e.g., the electronic device 101 or server 108 of FIG. 1) the electrode combination information according to the third condition of Table 1 to be identified by the user. As another example, the processor 210 may control the display 250 to display an image (or object) related to the human body reflecting the electrode combination information according to the third condition.

According to an embodiment, under the fourth condition of Table 1, the processor 210 may assign the third electrode 233 and the fourth electrode 234 to the connection points 403 and 404 of the negative pole of the human body, assign the second electrode 232 to the connection point 402 set as the reference pole of the connection points 401 and 402 of the positive pole, and assign the first electrode 231 to the connection point 401 of the remaining positive pole. In other words, under the fourth condition of Table 1, the processor 210 may set to assign the third electrode 233 and fourth electrode 234 of the negative pole to the third connection point 403 and fourth connection point 404 of the human body, assign the second electrode 232 of the reference pole to the second connection point 402 of the first connection point 401 and the second connection point 402, and assign the first electrode 231 of the positive pole to the first connection point 401. For example, the processor 210 may display, on the display 250, or transmit, to an external electronic device (e.g., the electronic device 101 or server 108 of FIG. 1) the electrode combination information according to the fourth condition of Table 1 to be identified by the user. As another example, the processor 210 may control the display 250 to display an image (or object) related to the human body reflecting the electrode combination information according to the fourth condition.

Referring to FIGS. 2, 3A, 3B, and 4, according to an embodiment, the processor 210 may identify the designated connection points 401, 402, 403, and 404, set conditions for connecting the four electrodes 231, 232, 233, and 234 to the designated connection points 401, 402, 403, and 404, respectively, and generate electrode combination information including the set conditions as shown in Table 1.

According to an embodiment, the processor 210 may compare the contact impedance value of the first electrode 231 and the contact impedance value of the second electrode 232 from among the at least four electrodes and assign the contact impedance value of the electrode having the smaller value as a first contact impedance value. The processor 210 may compare the contact impedance value of the third electrode 233 and the contact impedance value of the fourth electrode 234 among the at least four electrodes, and identify the contact impedance value of the electrode having the smaller value as a second contact impedance value. If the first contact impedance value is larger than the second contact impedance value, the processor 210 may assign two connection points (e.g., 401 and 402) to which the first electrode 231 and the second electrode 232 among the designated connection points 401, 402, 403, and 404 are connectable the positive poles. The processor 210 may set one connection point 403 or 404 as a reference pole. The reference pole may be assigned to the electrode having the larger value of the impedance value, between the third electrode 233 and the fourth electrode 234. A remaining connection point 403 or 404 may be set as the negative pole. In other words, if the first contact impedance value is larger than the second contact impedance value, the processor 210 may set the first and second electrodes 231 and 232 connected with the first and second connection points 401 and 402 as positive poles. The processor 210 may set one of the third electrode 233 connected with the third connection point 403 and the fourth electrode 234 connected with the fourth connection point 404 (or any one of the third electrode 233 and the fourth electrode 234) as the reference pole, based on which has a larger impedance value. Lastly, a remaining electrode may be set as the negative pole.

According to an embodiment of the present disclosure, unless the first contact impedance value is larger than the second contact impedance value, the processor 210 may set two connection points (e.g., 403 and 404) as negative poles, to which the third electrode 233 and the fourth electrode 234 among the designated connection points 401, 402, 403, and 404 may be connected. The processor 210 may set one connection point 401 or 402 as a reference pole, depending on which electrode has the larger impedance value. A remaining connection point 401 or 402 may be set as the positive pole. In other words, unless the first contact impedance value is larger than the second contact impedance value, the processor 210 may set the third and fourth electrodes 233 and 234 connected with the third and fourth connection points 403 and 404 as negative pole. The processor 210 may set the electrode having the larger value of the impedance value of the first electrode 231 connected with the first connection point 401 and the impedance value of the second electrode 232 connected with the second connection point 402 (or any one of the first electrode 231 and the second electrode 232) as the reference pole, and set one remaining electrode as the positive pole.

According to an embodiment, the electronic device 201 may include first to fourth electrodes 231, 232, 233, and 234, the positive pole, negative pole, and reference pole of the sensor module 240 (or the biometric signal measurement circuit of the sensor module 240), and a switch for selectively connecting the first to fourth electrodes 231, 232, 233, and 234 and the positive pole, negative pole, and reference pole of the sensor module 240 (or the biometric signal measurement circuit of the sensor module 240) under the control of the processor 210. The processor 210 may assign one electrode selected from among the first to fourth electrodes 231, 232, 233, and 234 to the reference pole, simultaneously assign two electrodes of the three remaining electrodes to one of the positive pole and the negative pole, and assign one remaining electrode to the rest of the positive pole and the negative pole, using the switch.

According to an embodiment, the processor 210 may output a signal to the human body through the electrodes 231, 232, 233, and 234 contacting the designated connection points of the human body and obtain contact impedance values based on the signal (e.g., BIA voltage and/or BIA current) received through the human body. For example, the signal received from the electrode module (or a transmission module) through the user's body to the electrode module (or reception module) may vary in signal characteristics (e.g., amplitude) due to particularities of the user's body. The processor 210 may measure the user's contact impedance value based on the variation in the received signal. According to an embodiment, the electronic device may measure the user's ECG based on the signal received from the connection points (e.g., connection points of positive pole and negative pole) as connected for ECG measurement, based on the received contact impedance values.

According to an embodiment, the processor 210 may transmit the set electrode combination information and/or ECG measurement result information to an external electronic device (e.g., the electronic device 101 of FIG. 1).

According to an embodiment, the processor 210, which may be a hardware module or software module (e.g., an application program), may include a hardware component (function) or software component (program) including at least one of various sensors, data measuring module, input/output interface, a module for managing the state or environment of the electronic device 201, or communication module as included in the electronic device 201.

According to an embodiment, the processor 210 may include, e.g., a hardware module, a software module, a firmware module, or a combination of two or more thereof. The processor 210 may lack at least some of the components or may include other components for performing an image processing operation in addition to the components.

Referring back to FIG. 2, according to an embodiment, the memory may store an application. For example, the memory 130 may store an application (function or program) related to electrocardiogram measurement, an exercise application, or a health care application.

According to an embodiment, the memory 220 may store various data generated during execution of the program 140, as well as a program (e.g., the program 140 of FIG. 1) used for functional operation. The memory 220 may include a program area 140 and a data area (not shown). The program area 140 may store relevant program information for driving the electronic device 201, such as an operating system (OS) (e.g., the OS 142 of FIG. 1) for booting the electronic device 201. The data area (not shown) may store transmitted and/or received data and generated data according to an embodiment. The memory 220 may include at least one storage medium of a flash memory, a hard disk, a multimedia card, a micro-type memory (e.g., a secure digital (SD) or an extreme digital (xD) memory), a random access memory (RAM), or a read only memory (ROM). According to an embodiment, the memory 220 may store the ECG measurement result information and/or the electrode combination information.

According to an embodiment, the electrode module 230 may include at least four electrodes respectively connected to designated connection points of the human body. The electrode module 230 may be configured so that among the at least four electrodes, at least two electrodes are disposed on a first surface (e.g., rear surface) of the housing 301 of the electronic device 201, and at least two electrodes among the at least four electrodes are disposed on at least two portions of a second member 305 formed to surround the display 250 disposed on a second surface (e.g., front surface) of the housing. For example, the at least two portions may be a third surface (e.g., side surface) of the housing. As another example, the electrode module 230 may be configured so that at least two electrodes are disposed on the first surface (e.g., rear surface) of the housing 301 of the electronic device 201, and one electrode is disposed on the second surface (e.g., front surface) of the housing, and one electrode is disposed on a third surface (e.g., side surface) of the housing. For example, the third surface may be a side surface of the housing, where the second member 305 formed to surround the display 250 disposed on the second surface (e.g., front surface) of the housing is disposed.

According to an embodiment, the sensor module 240 may include various sensors related to biometric signal detection (e.g., at least one sensor (e.g., ECG sensor or photoplethysmography (PPG) sensor) 241 of FIGS. 3A and 3B).

According to an embodiment, the display 250 may output the ECG measurement result information (e.g., text, object, or image) and/or the set electrode combination information under the control of the processor 210.

Further, according to an embodiment, the display 250 may be implemented as a touchscreen display. The display 250, when implemented together with an input unit in the form of a touchscreen display, may display various information generated according to the user's touch.

Further, according to an embodiment, the display 250 may include at least one of a liquid crystal display (LCD), a thin film transistor LCD (TFT-LCD), an organic light emitting diode (OLED) display, a light emitting diode (LED) display, an active matrix organic LED (AMOLED) display, a flexible display, or a three-dimensional display. Some of the displays may be configured in a transparent type or light-transmissive type allowing the outside to be viewed therethrough. This may be configured in the form of a transparent display including a transparent OLED (TOLED) display.

Further, according to another embodiment, in addition to the display 250, another mounted display module (e.g., an extended display or a flexible display) may be further included.

According to an embodiment, the communication module 260 may communicate with an external electronic device (e.g., the electronic device 101 of FIG. 1). For example, the communication module 260 may receive information used for measuring ECG from the external electronic device or transmit the ECG measurement result information. According to an embodiment, the communication module 260 may include a cellular module, a wireless-fidelity (Wi-Fi) module, a Bluetooth module, or a near field communication (NFC) module.

According to an embodiment, the electronic device 201 may further include an audio module (not shown) (e.g., the audio module 170 of FIG. 1). The audio module may output sounds and may include at least one of, e.g., an audio codec, a microphone (MIC), a receiver, an earphone output or a speaker. The audio module may output audio information related to the electrode combination information and/or the ECG measurement result information.

Major components of the electronic device 201 have been described above in connection with FIG. 2. According to an embodiment, however, all of the components of FIG. 2 are not essential components, and the electronic device 201 may be implemented with more or less components than those shown. The positions of the major components of the electronic device 201 described above in connection with FIG. 2 may be varied according to certain embodiments.

According to an embodiment, an electronic device (e.g., the electronic device 201 of FIGS. 2, 3A, and 3B) may comprise a memory (e.g., the memory 220 of FIG. 2), an electrode module (e.g., the electrode module 230 of FIG. 2) including at least four electrodes (e.g., the electrodes 231, 232, 233, and 234 of FIGS. 3A and 3B) and at least one processor (e.g., the processor 210 of FIG. 2) electrically connected with the electrode module and the memory. The at least one processor may be configured to obtain contact impedance values from the at least four electrodes respectively connected to designated connection points of a human body, set, and store in the memory, electrode combination information for respectively connecting the at least four electrodes with the designated connection points based on the obtained contact impedance values, and measure an electrocardiogram (ECG) of the human body based on signals received from the electrode module while the at least four electrodes are respectively connected to the designated connection points (e.g., the connection points 401, 402, 403, and 404 of FIG. 4) based on the electrode combination information.

According to an embodiment, the electrode module may be configured so that at least two electrodes among the at least four electrodes are disposed on one surface (e.g., the rear surface of the housing 301 of FIGS. 3A and 3B) of a housing of the electronic device, and at least two other electrodes among the at least four electrodes are disposed on another surface (e.g., a side surface of the housing 301 of FIGS. 3A and 3B) of the housing.

According to an embodiment, the electronic device may further comprise a display (e.g., the display 250 of FIG. 2) electrically connected with the at least one processor. The at least one processor may be configured to control the display to display information about a result of measurement of the ECG of the human body.

According to an embodiment, the electrode combination information may include identification information about one electrode among the at least four electrodes set to assign to a connection point of a reference pole among the designated connection points and identification information about remaining electrodes among the at least four electrodes set to respectively assign to connection points of a positive pole and a negative pole among the designated connection points.

According to an embodiment, the at least one processor may be configured to set to assign one electrode among the at least four electrodes to a connection point of a reference pole based on the obtained contact impedance values and set to respectively assign remaining electrodes among the at least four electrodes to connection points of a positive pole and a negative pole based on the obtained contact impedance values.

According to an embodiment, the at least one processor may measure the ECG based on signals received from electrodes set to respectively assign to the connection points of the positive pole and the negative pole among the designated connection points.

According to an embodiment, the at least one processor may be configured to, based on identifying that a smaller value of contact impedance values of the electrodes disposed on the one surface is larger than a smaller value of contact impedance values of the electrodes disposed on the other surface, set to assign the electrodes disposed on the one surface to connection points of a positive pole among the designated connection points, set to assign an electrode having a larger contact impedance value among the electrodes disposed on the other surface to a connection point of a reference pole, and set to assign a remaining electrode disposed on the other surface to a connection point of a negative pole among the designated connection points.

According to an embodiment, the at least one processor may be configured to, based on identifying that a smaller value of contact impedance values of the electrodes disposed on the other surface is larger than a smaller value of contact impedance values of the electrodes disposed on the one surface, set to assign the electrodes disposed on the other surface to connection points of a negative pole among the designated connection points, set to assign an electrode having a larger contact impedance value among the electrodes disposed on the one surface to a connection point of a reference pole, and set to assign a remaining electrode disposed on the one surface to a connection point of a positive pole among the designated connection points.

According to an embodiment, the electronic device may further comprise a communication module (e.g., the communication module 260 of FIG. 2) electrically connected with the at least one processor. The at least one processor may be configured to transmit the information about the result of measurement of the ECG of the human body to an external electronic device through the communication module.

According to an embodiment, the electronic device may further comprise a display electrically connected with the at least one processor. The at least one processor may be configured to control the display to display an object or image indicating to respectively assign the at least four electrodes to the designated connection points based on the electrode combination information.

An operation method in an electronic device as described above are described below in detail with reference to the accompanying drawings.

Figure 5:
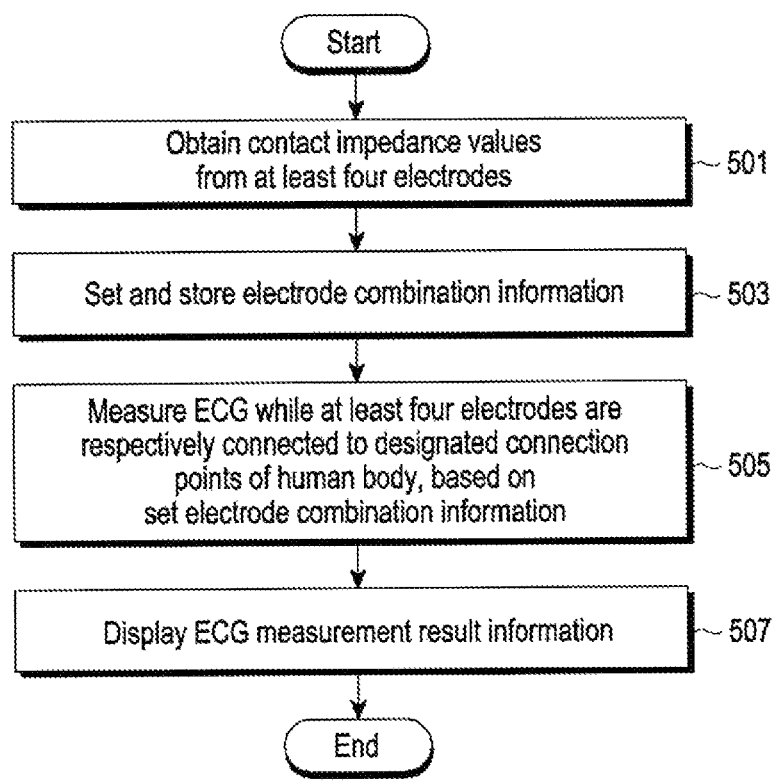
FIG. 5 is a view illustrating an example of an operation method of an electronic device according to an embodiment.

FIG. 5 is a view illustrating an example of an operation method of an electronic device according to an embodiment.

Referring to FIG. 5, according to an embodiment, in operation 501, the electronic device (e.g., the electronic device 201 of FIG. 2) may obtain contact impedance values from at least four electrodes, measured as the at least four electrodes included in the electrode module (e.g., the electrode module 230 of FIG. 1) while contacting designated connection points of the human body.

In operation 503, the electronic device may set electrode combination information for respectively connecting the at least four electrodes with the designated connection points of the human body based on the obtained contact impedance values and store the set electrode combination information in the memory (e.g., the memory 220 of FIG. 2). The electronic device may set to assign one electrode among the at least four electrodes as the reference pole based on the obtained contact impedance values, and to respectively assign the remaining electrodes from among the at least four electrodes as the positive pole(s) and the negative pole(s) based on the obtained contact impedance value. For example, the electronic device may transmit the set electrode combination information to an external electronic device (e.g., the electronic device 101 of FIG. 1). The electrode combination information may include identification information about one electrode among the at least four electrodes set to assign to the connection point of the reference pole among the designated connection points of the human body and identification information about the remaining electrodes among the at least four electrodes set to respectively assign to the connection points of the positive pole and negative pole among the designated connection points. For example, the electrode combination information may be set to map information related to the designated connection points to the identification information about each of the at least four electrodes for each designated condition and be configured in the form of a table.

In operation 505, the electronic device may measure the ECG of the human body based on the signals received from the electrode module while the at least four electrodes are respectively connected to the designated connection points of the human body based on the set electrode combination information. The electronic device may measure the ECG based on the signals received from the electrodes connected to the remaining connection points as the positive pole and negative pole, excepting the electrode connected as the reference pole among the at least four electrodes.

In operation 507, the electronic device may display the ECG measurement result information on the display 250. For example, the electronic device may transmit the ECG measurement result information to the external electronic device (e.g., the electronic device 101 or server 108 of FIG. 1).

According to an embodiment, the electronic device may output the signal to the human body through the electrodes contacting the designated connection points of the human body and measure the ECG based on the resultant signal transmitted and received through the human body. For example, the signal received from the transmission module (not shown) through the user's body to the reception module (not shown) may vary in signal characteristics (e.g., amplitude) due to the user's body. The electronic device may measure the user's contact impedance based on the variation in the signal received by the reception module. According to an embodiment, the electronic device may measure the user's ECG based on the contact impedance.

Figure 6:
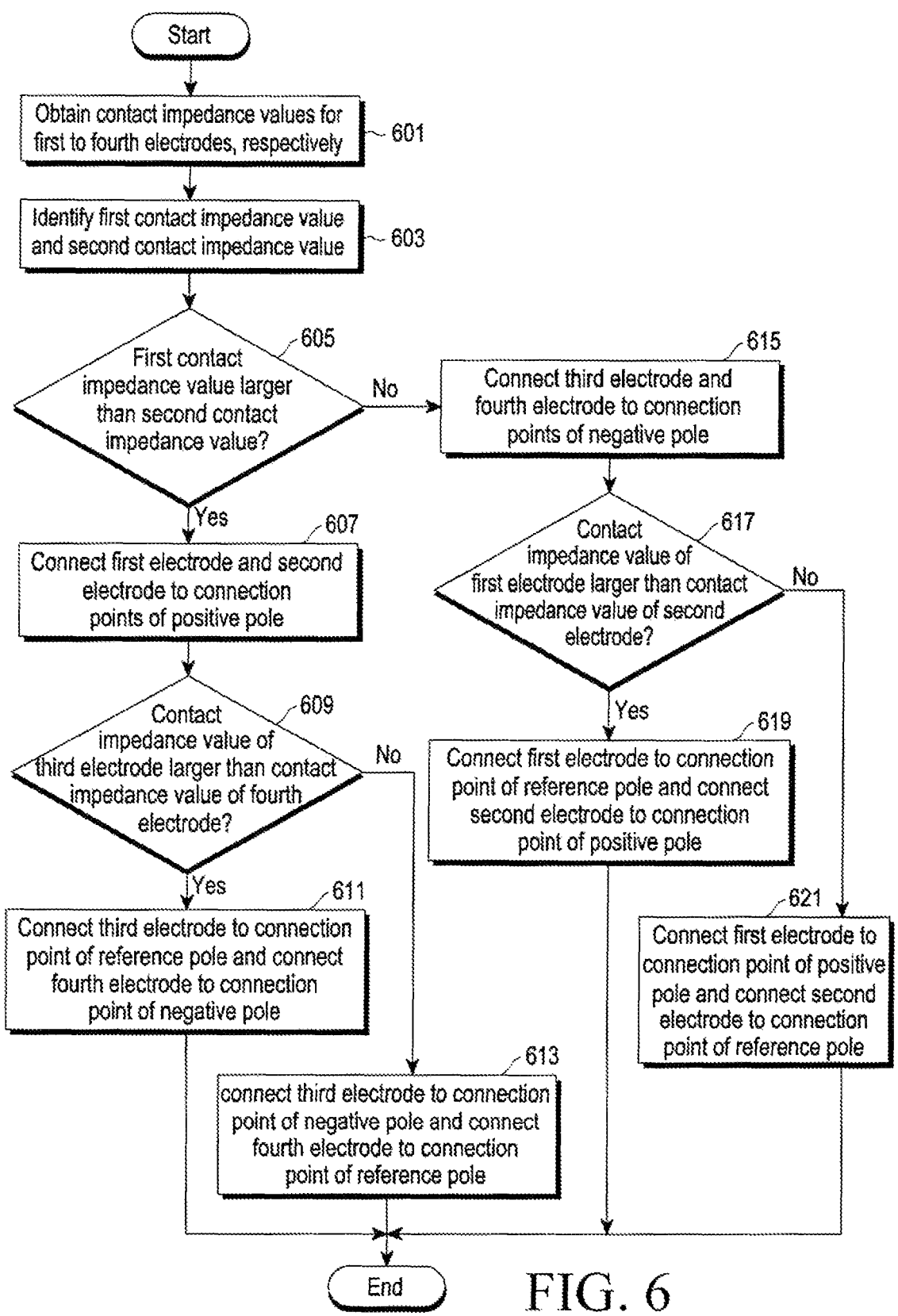
FIG. 6 is a view illustrating an example of an operation method of an electronic device according to an embodiment.

FIG. 6 is a view illustrating a method for operating an electronic device according to an embodiment.

Referring to FIG. 6, in operation 601, according to an embodiment, the electronic device (e.g., the electronic device 201 of FIG. 2) may obtain contact impedance values while in contact with the human body from at least four electrodes (e.g., first electrode to fourth electrode), respectively, that are included in the electrode module (e.g., the electrode module 230 of FIG. 2).

In operation 603, the electronic device may compare the contact impedance values of the first electrode and the second electrode and identify which electrode has the smaller contact impedance value. The electrode having the smaller contact impedance is set as the first contact impedance value. The electronic device may compare the contact impedance values of the third electrode and the fourth electrode and identify which electrode has the smaller contact impedance value. The electrode having the smaller contact impedance is set as the second contact impedance value.

In operation 605, the electronic device may identify whether the identified first contact impedance value is larger than the identified second contact impedance value. If it is identified that the first contact impedance value is larger than the second contact impedance value, the electronic device may perform operation 607. If the first contact impedance value is less than or equal to the second contact impedance value, operation 615 is performed instead.

In operation 607, the electronic device may assign both the first electrode and the second electrode to the connection points of the positive pole (e.g., the connection points 401 and 402 of FIGS. 3A and 3B), from among the designated connection points of the human body.

In operation 609, the electronic device may identify whether the contact impedance value of the third electrode is larger than the contact impedance value of the fourth electrode. If it is identified that the contact impedance value of the third electrode is larger than the contact impedance value of the fourth electrode, the electronic device may perform operation 611 and, if the contact impedance value of the third electrode is not larger than the contact impedance value of the fourth electrode, perform operation 613.

In operation 611, the electronic device may set to assign the third electrode to the connection point of the reference pole among the designated connection points of the human body and to assign the fourth electrode to the connection point of the negative pole among the designated connection points of the human body.

In operation 613, the electronic device may set to assign the third electrode to the connection point of the negative pole among the designated connection points of the human body and to assign the fourth electrode to the connection point of the reference pole.

If it is identified in operation 605 that the identified first contact impedance value is not larger than the identified second contact impedance value, the electronic device may, in operation 615, set to assign both the third electrode and the fourth electrode to the connection points of the negative pole among the designated connection points of the human body.

In operation 617, the electronic device may identify whether the contact impedance value of the first electrode is larger than the contact impedance value of the second electrode. If it is identified that the contact impedance value of the first electrode is larger than the contact impedance value of the second electrode, the electronic device may perform operation 619 and, unless the contact impedance value of the first electrode is larger than the contact impedance value of the second electrode, perform operation 621.

In operation 619, the electronic device assign the first electrode to the connection point of the reference pole among the designated connection points of the human body, and assign the second electrode to the connection point of the positive pole among the designated connection points of the human body.

In operation 621, the electronic device may assign the first electrode to the connection point of the positive pole among the designated connection points of the human body and assign the second electrode to the connection point of the reference pole among the designated connection points of the human body.

Figure 7A:
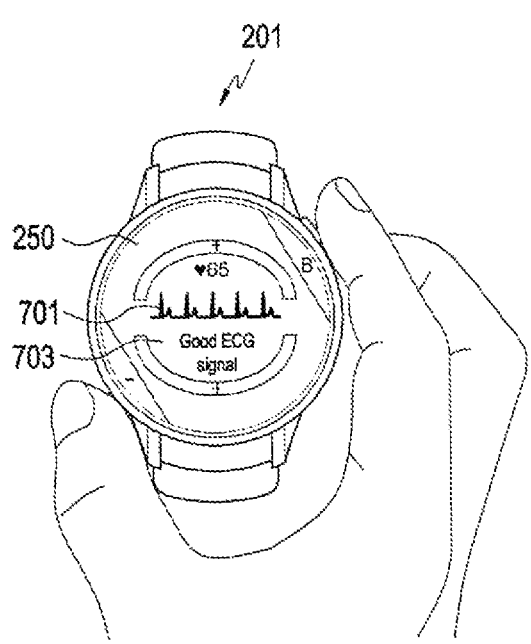
FIGS. 7A and 7B are views illustrating an example of a result of ECG measurement in an electronic device according to an embodiment.

As described above, according to the operations of FIG. 6, the electronic device may set electrode combination information based on the obtained contact impedance values and assign the at least four electrodes to the designated connection points according to the condition included in the set electrode combination information. For example, in a first condition (e.g., the conditions as in operations 601 to 611) in the operations of FIG. 6 as described above, the electronic device may display, on the display, an object or image (e.g., −, +, and B) indicating to assign both the first electrode and the second electrode to the connection points of the positive pole, assign the third electrode to the connection point of the reference pole, and assign the fourth electrode to the connection point of the negative pole. For example, as shown in FIG. 7A, the electronic device may display a first object (e.g., +) corresponding to the first electrode and the second electrode, display a second object (e.g., B) corresponding to the third electrode, and display a third object (e.g., −) corresponding to the fourth electrode. Without being limited thereto, the first object, the second object, and the third object may be displayed corresponding to different electrodes according to different conditions (e.g., second condition, third condition, and/or fourth condition). For example, in a second condition (e.g., the conditions as in operations 601 to 609 and 613) in the operations of FIG. 6 as described above, the electronic device may display, on the display, an object or image indicating to assign both the first electrode and the second electrode to the connection points of the positive pole, assign the third electrode to the connection point of the positive pole, and assign the fourth electrode to the connection point of the reference pole. For example, in a third condition (e.g., the conditions as in operations 601 to 605 and 615 to 619) in the operations of FIG. 6 as described above, the electronic device may display, on the display, an object or image indicating to assign both the third electrode and the fourth electrode to the connection points of the negative pole, assign the first electrode to the connection point of the reference pole, and assign the second electrode to the connection point of the positive pole. For example, in a fourth condition (e.g., the conditions as in operations 601 to 605, 615, 617, and 621) in the operations of FIG. 6 as described above, the electronic device may display, on the display, an object or image indicating to assign both the third electrode and the fourth electrode to the connection points of the negative pole, assign the first electrode to the connection point of the positive pole, and assign the second electrode to the connection point of the reference pole.

Figure 7B:
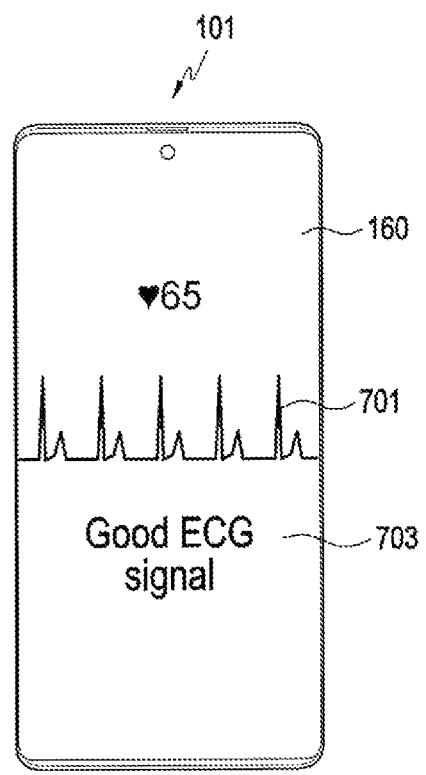

FIGS. 7A and 7B are views illustrating an example of a result of ECG measurement in an electronic device according to an embodiment.

Referring to FIGS. 7A and 7B, according to an embodiment, the electronic device may measure the ECG of the human body from the electrodes connected to the connection points configured to serve as the positive pole and negative pole, among the at least four electrodes in a state in which the at least four electrodes are respectively connected to the designated connection points of the human body. The electronic device may provide the ECG measurement result information to the user. For example, the electronic device may display an ECG graph 701 and text 703 (e.g., "Good ECG signal"), as the ECG measurement result information, on the display 250 (e.g., the display 250 of FIGS. 2, 3A, and 3B) as shown in FIG. 7A. As another example, as shown in FIG. 7B, the electronic device may transmit the ECG graph 701 and the text 703 (e.g., "Good ECG signal") to the external electronic device 101 (e.g., the electronic device 101 of FIG. 1). The external electronic device 101 may display the received ECG graph 701 and text 703 ("Good ECG signal") on the display 160 (e.g., the display module 160 of FIG. 1).

According to an embodiment, a method for operation in an electronic device may comprise obtaining contact impedance values from at least four electrodes (e.g., the electrodes 231, 232, 233, and 234 of FIGS. 3A and 3B) included in an electrode module (e.g., the electrode module 230 of FIG. 2) of the electronic device (e.g., the electronic device 201 of FIGS. 2 and 3A, and 3B), setting and storing electrode combination information for respectively connecting the at least four electrodes with designated connection points based on the obtained contact impedance values, and measuring an ECG of a human body based on signals received from the electrode module while the at least four electrodes are respectively connected to the designated connection points based on the electrode combination information.

According to an embodiment, at least two electrodes among the at least four electrodes may be disposed on one surface (e.g., the rear surface of the housing 301 of FIGS. 3A and 3B) of a housing of the electronic device, and at least two remaining electrodes among the at least four electrodes may be disposed on another surface (e.g., a side surface of the housing 301 of FIGS. 3A and 3B) of the housing.

According to an embodiment, the method may further comprise displaying information about a result of measurement of the ECG of the human body on a display (e.g., the display 250 of FIG. 2) of the electronic device.

According to an embodiment, the electrode combination information may include identification information about one electrode among the at least four electrodes set to assign to a connection point of a reference pole among the designated connection points and identification information about remaining electrodes among the at least four electrodes set to respectively assign to connection points of a positive pole and a negative pole among the designated connection points.

According to an embodiment, setting the electrode combination information to respectively assign the at least four electrodes with the designated connection points may include setting to assign one electrode among the at least four electrodes to a connection point of a reference pole based on the obtained contact impedance values and setting to respectively assign remaining electrodes among the at least four electrodes to connection points of a positive pole and a negative pole based on the obtained contact impedance values.

According to an embodiment, measuring the ECG of the human body based on the signals received from the electrode module may include measuring the ECG based on signals received from electrodes set to respectively assign to the connection points of the positive pole and the negative pole among the designated connection points.

According to an embodiment, setting the electrode combination information to respectively assign the at least four electrodes with the designated connection points may include, based on identifying that a smaller value of contact impedance values of the electrodes disposed on the one surface is larger than a smaller value of contact impedance values of the electrodes disposed on the other surface, setting to assign the electrodes disposed on the one surface to connection points of a positive pole among the designated connection points, setting to assign an electrode having a larger contact impedance value among the electrodes disposed on the other surface to a connection point of a reference pole, and setting to assign a remaining electrode disposed on the other surface to a connection point of a negative pole among the designated connection points.

According to an embodiment, setting the electrode combination information to respectively assign the at least four electrodes with the designated connection points may include, based on identifying that a smaller value of contact impedance values of the electrodes disposed on the other surface is larger than a smaller value of contact impedance values of the electrodes disposed on the one surface, setting to assign the electrodes disposed on the other surface to connection points of a negative pole among the designated connection points, setting to assign an electrode having a larger contact impedance value among the electrodes disposed on the one surface to a connection point of a reference pole, and setting to assign a remaining electrode disposed on the one surface to a connection point of a positive pole among the designated connection points.

According to an embodiment, the method may further comprise transmitting the information about the result of measurement of the ECG of the human body to an external electronic device through a communication module (e.g., the communication module 260 of FIG. 2) of the electronic device.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, Flash Memories, and/or the like. Examples of the program commands may include not only machine language codes but also high-level language codes which are executable by various computing means using an interpreter. The aforementioned hardware devices may be configured to operate as one or more software modules to carry out exemplary embodiments of the disclosure, and vice versa.

According to an embodiment, there may be provided a non-transitory storing medium storing a program including executable instructions that, when executed by a processor, enable the processor to obtain contact impedance values from at least four electrodes included in an electrode module of the electronic device, set and store electrode combination information for respectively connecting the at least four electrodes with designated connection points based on the obtained contact impedance values, and measure an ECG of a human body based on signals received from the electrode module while the at least four electrodes are respectively connected to the designated connection points based on the electrode combination information.

The embodiments disclosed herein are proposed for description and understanding of the disclosed technology and does not limit the scope of the disclosure. Accordingly, the scope of the disclosure should be interpreted as including all changes or certain embodiments based on the technical spirit of the disclosure.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   an electrode module including at least four electrodes; and
   at least one processor electrically connected with the electrode module,
   memory storing instructions that, when executed by the at least one processor, cause the electronic device to:
   measure contact impedance values from the at least four electrodes when in contact with designated connection points of a human body;
   determine electrode combination for the at least four electrodes, based on the measured contact impedance values, wherein the at least four electrodes are set as a positive pole, a negative pole, and a reference pole based on the electrode combination; and
   measure an electrocardiogram (ECG) of the human body based on signals received from the electrode module while the at least four electrodes are set as the positive pole, the negative pole, and the reference pole based on the electrode combination.

2. The electronic device of claim 1, further comprising a housing, wherein the electrode module is configured so that at least two electrodes among the at least four electrodes are disposed on one surface of the housing, and at least two other electrodes among the at least four electrodes are disposed on another surface of the housing.

3. The electronic device of claim 2, wherein the instructions that, when executed by the at least one processor, cause the electronic device to:
   identify that a first contact impedance value of the electrodes disposed on the one surface is larger than a second contact impedance value of the electrodes disposed on the other surface; and
   based on identifying the first contact impedance value is larger than the second contact impedance value:
      set to connect the electrodes disposed on the one surface to connection points of the positive pole among the designated connection points,
      set to connect an electrode having a larger contact impedance value from among electrodes disposed on the other surface to a connection point of the reference pole, and
      set to connect a remaining electrode disposed on the other surface to a connection point of the negative pole among the designated connection points.

4. The electronic device of claim 2, wherein the instructions that, when executed by the at least one processor, cause the electronic device to:
   identify that a first contact impedance value of the at least two other electrodes disposed on the other surface is larger than a second contact impedance value of the at least two electrodes disposed on the one surface:
   based on identifying the first contact impedance value is larger than the second contact impedance value:
      set to connect the at least two other electrodes disposed on the other surface to connection points of the negative pole among the designated connection points,
      set to connect an electrode having a larger contact impedance value among the at least two electrodes disposed on the one surface to a connection point of the reference pole, and
      set to connect a remaining electrode disposed on the one surface to a connection point of the positive pole among the designated connection points.

5. The electronic device of claim 1, further comprising:
   a display electrically connected with the at least one processor; and
   a communication module electrically connected with the at least one processor,
   wherein the instructions that, when executed by the at least one processor, cause the electronic device to:
   control the display to display result measurement information of the ECG of the human body; and
   transmit the result measurement information of the ECG of the human body to an external electronic device through the communication module, and
   wherein the electrode combination includes;
      identification information about one electrode among the at least four electrodes set to connect to a connection point as the reference pole from among the designated connection points, and
      identification information about remaining electrodes excepting the one electrode from among the at least four electrodes set to respectively connect to connection points set respectively as the positive pole and a negative pole from among the designated connection points.

6. The electronic device of claim 1, further comprising a display electrically connected with the at least one processor,
   wherein the instructions that, when executed by the at least one processor, cause the electronic device to:
   control the display to display an object or image indicating respective connection of the at least four electrodes to the designated connection points, based on the electrode combination.

7. A method for operation in an electronic device, the method comprising:
   measuring contact impedance values from at least four electrodes, included in an electrode module of the electronic device, when in contact with designated connection points of a human body;
   determining electrode combination for the at least four electrodes, based on the measured contact impedance values, wherein the at least four electrodes are set as a positive pole, a negative pole, and a reference pole based on the electrode combination; and
   measuring an ECG of a human body based on signals received from the electrode module while the at least four electrodes are set as the positive pole, the negative pole, and the reference pole, based on the electrode combination.

8. The method of claim 7, wherein at least two electrodes among the at least four electrodes are disposed on one surface of a housing of the electronic device, and at least two remaining electrodes among the at least four electrodes are disposed on another surface of the housing.

9. The method of claim 8, wherein determining the electrode combination to respectively connect the at least four electrodes with the designated connection points includes:
    identify that a first contact impedance value of electrodes from among the electrodes disposed on the one surface is larger than a second contact impedance value of the at least two remaining electrodes disposed on the other surface:
    based on identifying the first contact impedance value is larger than the second contact impedance value:
        setting to connect the electrodes disposed on the one surface to connection points of the positive pole among the designated connection points;
        setting to connect an electrode having a larger contact impedance value among the electrodes disposed on the other surface to a connection point of the reference pole; and
        setting to connect a remaining electrode disposed on the other surface to a connection point of the negative pole among the designated connection points.

10. The method of claim 8, wherein determining the electrode combination to respectively connect the at least four electrodes with the designated connection points further includes:
    identify that a first contact impedance value of the at least two remaining electrodes disposed on the other surface is larger than a second contact impedance value of the electrodes disposed on the one surface:
    based on identifying the first contact impedance value is larger than the second contact impedance value:
        setting to connect the at least two electrodes disposed on the one surface to connection points of the negative pole among the designated connection points;
        setting to connect an electrode having a larger contact impedance value among the electrodes disposed on the one surface to a connection point of the reference pole; and
        setting to connect a remaining electrode disposed on the one surface to a connection point of the positive pole among the designated connection points.

11. The method of claim 7, further comprising:
    displaying a result measurement information of a ECG waveform of the human body on a display of the electronic device; and
    transmitting the result measurement of the ECG of the human body to an external electronic device through a communication module of the electronic device,
    wherein the electrode combination includes identification information about one electrode among the at least four electrodes set to connect to a connection point of the reference pole from among the designated connection points and identification information about remaining electrodes excepting the one electrode from among the at least four electrodes set to respectively connect to connection points set respectively as the positive pole and the negative pole from among the designated connection points.

12. A non-transitory storing medium storing a program including executable instructions that, when executed by a processor of an electronic device, cause the electronic device to:
    measure contact impedance values from at least four electrodes, included in an electrode module of the electronic device, when in contact with designated connection points of a human body;
    determine electrode combination for the at least four electrodes based on the measured contact impedance values, wherein the at least four electrodes are set as a positive pole, a negative pole, and a reference pole based on the electrode combination; and
    measure an ECG of a human body based on signals received from the electrode module while the at least four electrodes are set as the positive pole, the negative pole, and the reference pole, based on the electrode combination.

* * * * *